Sept. 3, 1929.   T. M. EYNON   1,727,101
VACUUM CONNECTED INDICATOR FOR GASOLINE DEPTH
Filed April 5, 1922   2 Sheets-Sheet 1
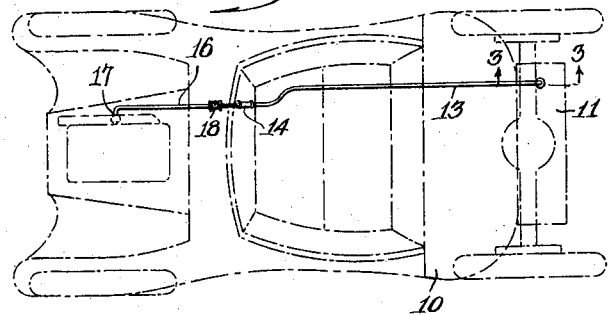
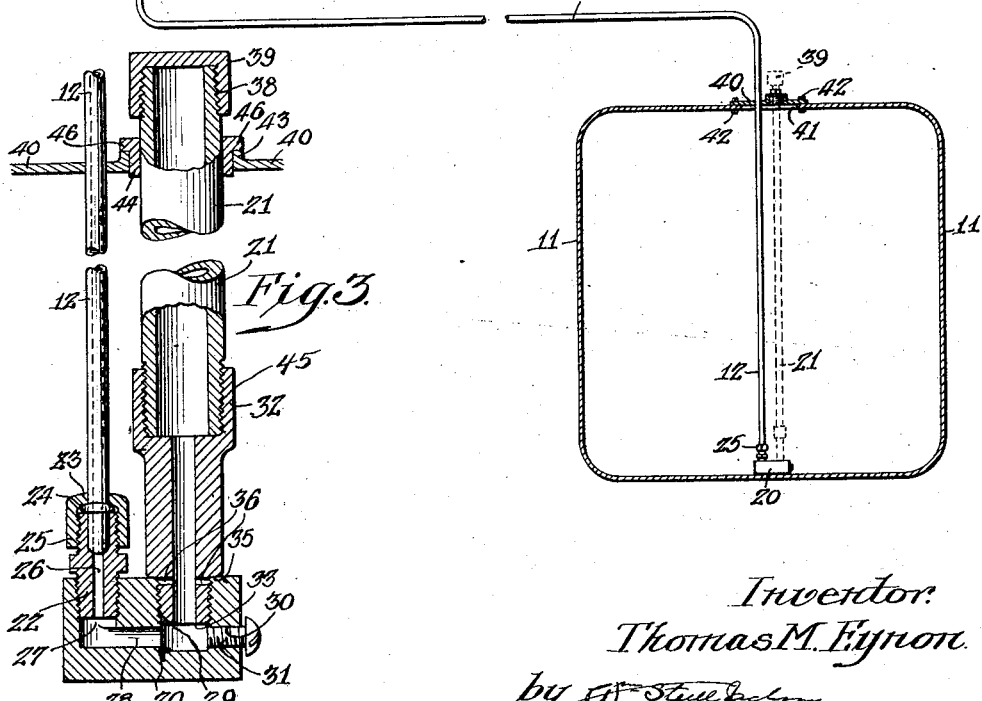
Inventor:
Thomas M. Eynon
by
Attorney.

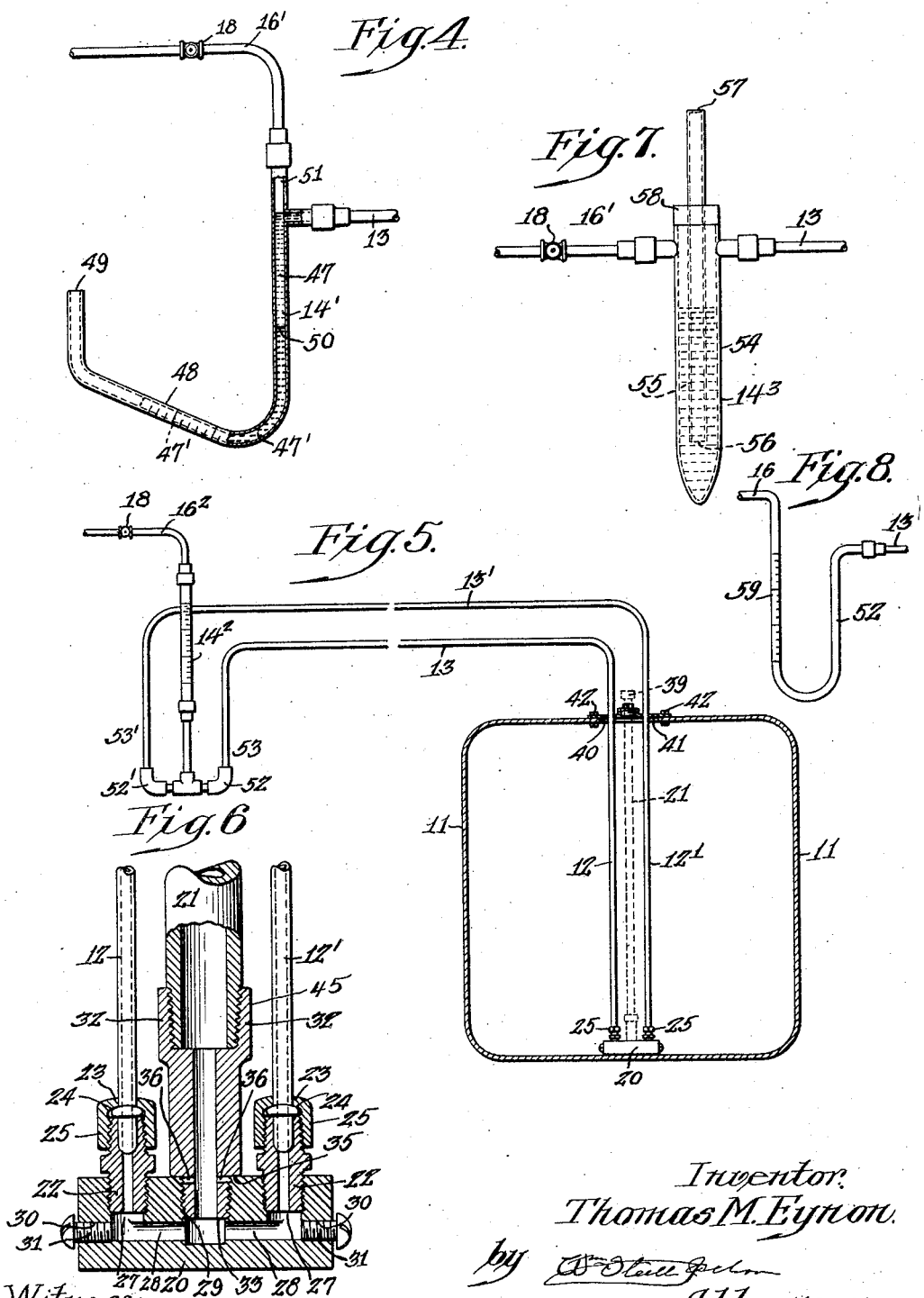

Patented Sept. 3, 1929.

1,727,101

UNITED STATES PATENT OFFICE.

THOMAS M. EYNON, OF PHILADELPHIA, PENNSYLVANIA.

VACUUM-CONNECTED INDICATOR FOR GASOLINE DEPTH.

Application filed April 5, 1922. Serial No. 549,852.

My invention relates to devices for indicating the height of gasoline in an automobile tank.

The main purpose of my invention is to provide a liquid other than gasoline by which the indication may be given, and to place and maintain this liquid in registering position.

A further purpose is to supply a liquid to the piping of an indicating system from the tank end of the system.

A further purpose is to admit the liquid through the tank end of the system free from interference by the gasoline and from leakage and subsequently to open the system to gasoline pressure within the tank.

A further purpose is to provide an indicating pipe system with a terminal within the tank and to feed indicating liquid into the system through a pipe accessible from the exterior of the tank, and which can be opened to the gasoline or closed therefrom while connected to the system as preferred.

A further purpose is to supply a registering liquid to a pipe system for registration from the tank end of the pipe independently of whether the tank be filled or empty.

A further purpose is to utilize the intake of a gasoline engine as a vacuum pump for the purpose of creating a vacuum at the upper end a liquid indicating system, in order to fill the system with liquid to the height required, and subsequently close the connection with the intake to maintain the setting secured.

Further purposes will appear in the specification and in the claims.

My invention relates both to the apparatus and to the processes involved.

I have preferred to illustrate my invention by several forms only of many which might be selected embodying the same principles; and have chosen forms which have been tried out by me and which have not only proved to be practical, efficient and reliable, but which at the same time well illustrate the principles of my invention.

Figure 1 is a skeleton top plan view of an automobile showing the general location of parts comprising my invention.

Figure 2 is a broken sectional view showing the tank and connections illustrated in Figure 1.

Figure 2ª is a broken sectional view of a portion of Figure 2.

Figure 3 is an enlarged detailed section upon line 3—3 of Figure 1.

Figure 3ª is a broken sectional view of a modified form of a portion of Figure 3.

Figure 4 is an enlarged sectional view of another type of indicator.

Figure 5 is a side elevation, partly in section, showing another form of indicator and connections.

Figure 6 is an enlarged section showing part of the structure of Figure 5.

Figures 7 and 8 are elevations of still further forms of indicator.

In the drawings similar numerals indicate like parts.

Taking up the showing of Figures 1, 2 and 3 in illustration and not in limitation:—

The automobile 10 is provided with a tank 11 located in any preferred position, shown for convenience in the more usual location at the rear of the car.

From the bottom of this tank connections, including a pipe 12 extend out through the tank and along at 13 to an indicator 14 supplied with suitable graduations if desired. The upper part of the indicator at 15 is under a partial vacuum by reason of which the operative conditions are maintained. This may be obtained by the individual sucking the air out of the pipe or, more conveniently through a connection 16 to the engine intake at some such point as 17 so that the vacuum condition of the engine intake when the air inlet is closed may be used to create a vacuum in said indicator adjustable with adjustment of the air closure. Any desired extent of vacuum may then be maintained by closing a valve such as 18 within this connection.

It is my purpose to use a liquid in the pipe connections and indicator, either continuously or interrupted by an air gap if desired, and select a liquid which is heavier than the gasoline and which will not freeze. Owing to the difficulty of initially supplying such a liquid and of replacing it in case of requirement of correction of the position of the liquid indicating column, I have provided also a convenient system by which this liquid may be inserted from outside the tank to set the gauge or to replace or renew the liquid at any time. A different liquid may be used in the indicator from that in the connection.

The indicator 14 comprises a straight sight tube suitably graduated at 19 to read liquid height and within which in this form the liquid of the connections is intended to be lifted by the effective difference between the vacuum pressure and the atmospheric pressure, to which is added the pressure due to head of the column of gasoline in the tank.

In order to fill the connections 12 and 13 reliably and conveniently with the transmission liquid I provide a terminal 20 with which the pipe 12 is connected and a filling tube 21 in fluid communication with the terminal to afford a passage for application of the transmission liquid. The manner in which the terminal is held in position will differ, of course, with the preference of the individual, as will, also, the connection of the pipe 12 with it, and the character of the filling pipe, and of its connection for the purpose intended.

The terminal 20 is preferably rested upon the bottom of the tank or within a pocket in the bottom.

In the construction shown the pipe 12 is connected with the terminal 20 by a hollow plug 22 which is screwed into the terminal and into which the pipe extends. The lower part of the pipe is provided with a collar 24 against which bears an inwardly directed flange 23 upon a cap 25 threaded to the upper end of the plug. By this construction the pipe is readily removable but is sealed against and held rigidly to the terminal.

The passage 26 within the plug communicates with an opening 27, passage 28, and opening 29. The passage 28 is conveniently drilled through an opening 30 which is threaded and is closed by a screw 31.

The lower end of the tube 21 is united to a fitting 32, whose lower end 33 screws into opening 29. The fitting, therefore, provides communication from the tube 21 to the pipe 12.

The lower part of the fitting 32 is flanged at 35 to engage with the terminal 20 about the opening 29 so that, when the fitting is screwed home, the shoulder seals against the terminal.

When the fitting is partially unscrewed, communication is provided between the tank and the interior of the terminal by openings 36 which are then accessible to the gasoline of the tank, permitting it to enter the fitting for the purpose of utilizing the head of the gasoline to press upon the liquid within the terminal and to vary the indication given by the gauge 14.

The upper end of the fitting 32 is formed as a threaded socket to receive the pipe or tube 21 and the upper end of the tube is threaded at 38 for a cap 39 by which it is closed.

In order that the entire mechanism may be inserted and withdrawn, both the pipe 12 and the pipe 21 are passed through a plate 40 which affords a closure for an opening 41, sufficiently large to permit this withdrawal. The plate is held in place by bolts 42.

The pipe 21 is allowed to have longitudinal movement in the plate without danger of spashing gasoline therefrom, by cupping the plate as at 43 and seating within this cupped portion a collar 44 as large as the outer portion 45 of the fitting. The sleeve or collar 44 is free to move in the cupped portion 43 and a flange 46 may be used to additionally seal when in lowered position. The pipe 21 with its attachments can, therefore, be withdrawn through the opening in the plate.

In operation, the tube 21 with its fitting is screwed down to position within the terminal 20 so that the shoulder 35 leaves the tube accessible from the outside and a predetermined charge of oil or other liquid, intended ultimately to fill the pipe 12 and connections 13, is poured into the tube. The valve 18 is open while the engine is running and the air inlet to the carburetor is closed or nearly so as to give a strong vacuum in the carburetor, so as to utilize the vacuum of the intake (or suction applied by the mouth of the operator) to reduce the pressure in the pipe 12 and connections 13 to produce a condition of partial vacuum in these connections. As a result of air pressure upon the surface of the liquid—ordinarily oil—it is forced up through the pipe 12 and connections 13 and into the graduated indicator. The valve 18 may be partially closed as the oil goes nearly to position and then finally closed just as it reaches the zero position, or the oil may be passed beyond zero and the valve may be subsequently partly opened to allow the column to drop slightly until the oil is at the right height for zero reading. The adjustment may be facilitated by adjusting the choke to give a close approximation to the exact degree of vacuum. Before the height is finally set but after approximate setting, the pipe 21 and its fitting are screwed out of the terminal 20 sufficiently to allow escape of any oil which may be above the openings 36 and which may act as a head to lift the oil and to allow for the gasoline which is to be placed within the tank to have access to the oil through the openings 36. The gauge is set preferably with a minimum of gasoline in the tank and if zero reading be desired without any gasoline head in the tank.

The terminal may be seated in a recess in the bottom of the tank so as to bring the top of the terminal approximately level with the bottom of the tank. This refinement will ordinarily not be necessary and therefore has not been illustrated.

Instead of withdrawing the filling tube 21 part way only to admit gasoline pressure above the fitting the tube may be withdrawn wholly and its place may be taken by plug closure; with the disadvantage, however, that more splashing of the oil or other indicating or transmitting liquid is allowed than would be the case if the tube were in place.

In the form shown in Figure 4 the indicator 14′ is intended to be provided with a different liquid 47′ from the liquid 47 by which the pressure is transmitted. For example, mercury may be used at 47′ in the scale-reading leg, the section 48 of the tube, and the tube may be open at the end 49 so as to maintain some such level of mercury within the body of the tube as at 50. By reason of the partial vacuum within the outer part of the tube 51, secured by any means including those indicated some such transmission liquid as oil is brought up preferably close to or upon the surface of the liquid 47′ and is maintained in this conjunction to the liquid 47′ by reason of the vacuum condition described. Addition to or reduction of the depth of gasoline in the tank reduces or increases the extent of vacuum within the upper part of the tube, reversely affecting the reading of the liquid 47′ within leg 48.

In the form shown in Figures 5 and 6, two tube connections with the terminal 20 are shown in the pipes 12, 12′, 13, 13′, and these are connected to two legs 52, 52′ at opposite sides 53, 53′ of a single gauge $14^2$. The gauge is exhausted in any of the ways described for exhausting the gauges shown in the other figures, though pipe $16^2$ closed off by valve 18. In theory this does not differ from the form shown in Figure 2 but gives an additional connection with the terminal, made through duplicate hollow plugs 22 and corresponding pipe connections on opposite sides of a single insert filling tube connection of the form shown in Figure 3. The additional connection protects against stoppage and reduces the flow resistance for the same standard size of tubing connections.

In Figure 7 a single connection only is used as in Figures 2 and 4 but the gauge $14^3$ comprises an outer transparent casing 54 and an internal reading tube 55 open at the bottom at 56 and sealed at the top at 57. Either the content of the inner tube must be so placed as to show constantly and to read above the level of the liquid in the outer casing or the liquid in the outer casing must be transparent enough either through thinness of coating or transparency of material for the height of the liquid within the inner tube to be readable through it.

The outer tube is sealed at the top at 58 and the connection 13 is connected with it. The pipe 16′ also connects with the outer tube and this connection is shown above the surface of the liquid though it could be made below this surface.

I much prefer placing the tube 55 close to the nearer face of the outer tube in the illustration, so that any part of the length of this inner tube is available for readings. The closing of the upper end of the inner tube restrains the liquid from entering this tube.

Obviously, the form shown in Figure 5 is merely a combined or double U-tube and a single U-tube may be sustituted for it where a single connection only with the tank is desired. This I have shown in Figure 8 in which the leg 52 of the U-tube may be connected to the vacuum and to a pipe 13 such as shown in Figure 1 and the leg 59 may be open to the atmosphere or closed, as desired, or the vacuum may be connected with the leg 59 and leg 52 be connected with 13, all as arranged for in the part of the scale selected for the reading. In the illustration the leg 59 is intended to be open to the atmosphere and air within the connection 13 and the top of the leg 52 of the U-tube is used in conjunction with the oil or other liquid largely or entirely filling the connection 13 to secure the desired reading.

It will be obvious that part of the benefit of my invention may be obtained by various other structures which will be suggested to those skilled in the art by my disclosure herein, and it is my purpose to include all such as come within the reasonable spirit and scope of my claims.

Having thus described my invention, what I claim as new and desire to secure by Letters Patent is:—

1. In an automobile indicator for height of gasoline, the combination of a gasoline tank, a pipe extending from the outside to the bottom of the tank, a gauge with which the pipe is connected, a liquid in the pipe heavier than gasoline, a gasoline engine having an intake and a connection from the gauge to said intake to apply intake vacuum to the gauge.

2. In a device for indicating gasoline height in an automobile tank, a gauge, a gasoline tank, connections therebetween extending to the bottom of the tank, an automobile engine having an air intake, connections from the gauge to the intake adapted to apply the intake vacuum conditions to the gauge and a valve in said connections to maintain the vacuum conditions in the gauge.

3. An indicating system for the depth of gasoline in a gasoline tank, comprising a gasoline engine having an intake, an indicator, a tank, piping from the indicator extending to the bottom of the tank and a terminal for said pipe disposed within the tank, in combination with a filler for said pipe communicating with the terminal and accessible from the outside of the tank, and a connection beyond the indicator to the engine intake.

THOMAS M. EYNON.